2,900,336
DRILLING FLUIDS

William E. Brown, Dallas, Tex., William J. McVeagh, Pittsburgh, Pa., and Thomas H. Wallace, Los Angeles, Calif., assignors to Gulf Research & Development Company, Pittsburgh, Pa., a corporation of Delaware No Drawing. Application December 20, 1956
Serial No. 629,485

6 Claims. (Cl. 252—8.5)

This invention relates to drilling fluids and more particularly to treated drilling fluids.

In drilling oil and gas wells, particularly by the rotary method, it is customary to circulate around the drill a drilling fluid which serves to carry bit cuttings out of the bore hole, lubricate the drilling equipment and provide sufficient hydrostatic head in the bore hole to control the escape of gases or liquids from formations encountered in the drilling operation. In order to form a lining on the wall of the bore hole finely divided colloidal material such as clay, bentonite or the like is often added to the drilling fluid. To impart the proper density to the drilling fluid and obtain sufficient hydrostatic head in the bore hole weighting material such as barite (barium sulphate), iron oxide, finely divided silica silt, lead sulphide (galena), etc. are often added thereto. During drilling the drilling equipment traverses strata composed of materials such as clays, shales, etc., and cuttings of these materials find their way into the drilling fluid.

Normally during drilling the drilling fluid is circulated down through the interior of the drill pipe and then returned to the surface through the annulus between the drill pipe and the wall of the bore hole. The drilling fluid containing water picked up in the well is removed from the well and then generally passed over a screen, thereafter to a mud pit and then returned to the drill pipe for recirculation. The finely divided colloidal material and weighting material which have been added to the drill fluid, either before or after the beginning of the drilling operation, are desirably maintained in the drilling fluid throughout the drilling operation and therefore should remain in the drilling fluid during recirculation. The cuttings desirably remain in the drilling fluid only until the drilling fluid reaches the surface where they are removed with the aqueous phase of the drilling fluid or separated therefrom mechanically when the drilling fluid passes through the screen at the surface. In mechanical separation the clay and weighting agent added originally in the case of water base drilling fluids, or the weighting material added in the case of oil base drilling fluids, being smaller in size than the cuttings, pass through the screen without difficulty.

When the drilling fluid employed is one having a continuous oil phase, such as water-in-oil emulsion, the solid material, such as that mentioned earlier, can settle out suddenly and causes sticking of the drilling tool. This sudden settling occurs when an excess of water wet cuttings are occluded in the oil base drilling fluid or when a large quantity of water enters the hole. Similarly, at the surface the problem is serious, for the added clay and weighting material which settles out is lost and must be replaced at great expense.

We have found the above difficulties can be overcome and the solid material mentioned previously can be maintained in suspension in the drilling fluid during the drilling operation with the improved drilling fluid of this invention. The improved drilling fluid comprises an oil base drilling fluid having dissolved therein a controlled amount of an organic material selected from the group consisting of compounds represented by the following general formulae:

$$[RN^+H_2(CH_2)_3NH_3^+][X^-]_2,$$

wherein R is selected from the group consisting of alkyl and alkene radicals having about 8 to about 22 carbon atoms, preferably about 12 to about 18 carbon atoms, and X is an anion of an acid (preferably one of a weak organic acid) such as acetate, stearate, oleate, chloride, etc. and $$[H_3N^+R]X^-$$

wherein R is an alkyl radical having about 6 to about 22 carbon atoms, preferably about 8 to about 15 carbon atoms and X is an anion of an acid (preferably one of a weak organic acid) such as acetate, stearate, oleate, chloride, etc.

Representative of alkyl and alkene radicals in the first formula are dodecyl, tetradecyl, octadecyl, octadecenyl and octadecadienyl. Examples of alkyl radicals in the second formula are octyl, dodecyl, hexadecyl and octadecyl. As examples of compounds which are included in the above formulae can be mentioned Duomeen T dioleate $$[(RN^+H_2CH_2CH_2CH_2NH_3^+)$$
$$(C_8H_{17}CH=CHCH_2CH_2CH_2CH_2CH_2CH_2CH_2COO^-)_2,$$

wherein R can be n-octadecadienyl, hexadecyl and octadecyl]; Armac 8D [$(H_3N^+R)$ $(CH_3COO^-)$, wherein R is octyl]; Armac 12D [$(H_3N^+R)$ $(CH_3COO^-)$, wherein R is dodecyl]; Armac 16D [$(H_3N^+R)$ $(CH_3COO^-)$, wherein R is hexadecyl]; Alkylamine 81T Acetate $(t-C_{12-15}H_{25-31}N^+H_3)$ $(CH_3COO^-)$.

The drilling fluid to which the above compounds are added are preferably oil base fluids wherein oil is in the continuous phase, such as water-in-oil emulsions containing about from 0.1 to about 75 percent by weight of water, and drilling fluids containing oil alone. Desirably the amount of organic compound added to the drilling fluid is that which is sufficient to maintain in suspension substantially all of the solid material which will be added to the drilling fluid for a desirable purpose, such as clay or bentonite, and weighting agents, for example, barite, or which will find its way in the drilling fluid in use, such as cuttings, for example clays, shales, etc. While the above results will be obtained when the amount of organic material added makes up at least about 0.1 percent by weight relative to the drilling fluid and the materials incorporated therein best results are obtained when the amount added is about 0.5 to about 5.0 percent by weight.

In order to illustrate the benefits of this invention several experiments were made in each of which a controlled amount of organic material encompassed by the formulae defined earlier was used. The oil used in the runs was a crude from the Ellenberger Field in West Texas having the following specification:

| | |
|---|---|
| API gravity | 42° |
| Percent sulphur by weight | 0.18 |
| Viscosity at 100° F., centistokes | 3.27 |
| Percent boiling in the 50° to 200° C. boiling range at atmospheric pressure | 26.3 |
| Paraffin-naphthene content of above fraction, percent | 88.5 |
| Aromatic content of above fraction, percent | 11.5 |
| Wax content of crude, percent | 3.5 |
| Resin content of crude, percent | 3.9 |

The above oil was mixed with ten times its volume of normal pentane to precipitate the asphaltenes, which were filtered off. Pentane was then stripped from the filtrate and the resulting asphaltene-free crude was freed of colored resins by elution chromatography over alumina, pentane being the eluent. The pentane was stripped from the eluate; the pentane-free eluate was the "crude" oil used in the tests. In each case the organic material was dissolved in 15 milliliters of the oil defined above. The solution obtained was then added to 5 milliliters of water suspension containing one percent by weight of Wyoming bentonite, and the resulting mixture was shaken for 15 minutes and allowed to stand overnight. The amounts and compounds added in each case were as follows: 0.5 gram of Armac 12D [$(H_3N^+R)(CH_3COO^-)$, wherein R is dodecyl], 0.62 gram of Armac 16D [$(H_3N^+R)(CH_3COO^-)$, wherein R is hexadecyl], 0.67 gram of Armac 18D [$(H_3N^+R)(CH_3COO^-)$, wherein R is octadecyl], 0.55 gram of Alkylamine JM-T Acetate $$[t\text{-}C_{18}H_{37}N^+H_3][CH_3COO^-]$$

and 0.55 gram of Alkylamine 81-T Acetate $$[t\text{-}C_{12-15}H_{25-31}N^+H_3][CH_3COO^-]$$

In each instance the continuous phase of the fluid was oil. With Armac 12D, Armac 16D, and Alkylamine JM-T Acetate, the clay was found to be in gelatinous suspension, while with Armac 18D and Alkylamine 81-T Acetate the clay was found to be in the form of gelatinous curds. It is apparent therefore that solid material carried in a drilling fluid prepared in accordance with our invention will remain in suspension therein and will not settle out.

Obviously many modifications and variations of the invention, as hereinabove set forth, can be made without departing from the spirit and scope thereof, and therefore only such limitations should be imposed as are indicated in the appended claims.

We claim:

1. A drilling fluid comprising a solution in oil, wherein the oil is in the continuous phase, of an organic material selected from the group consisting of compounds represented by the following general formulae:

$$[RN^+H_2(CH_2)_3NH_3^+][X^-]_2$$

wherein R is selected from the group consisting of alkyl and alkene radicals and X is an anion of an acid and $$[H_3N^+R][X^-]$$

wherein R is an alkyl radical and said latter X is an anion of an acid, the amount of said organic material present being in excess of that necessary to suspend solids originally present in the compounding of a mud prepared with said drilling fluid, said excess being sufficient to suspend in said drilling fluid solids subsequently encountered during drilling.

2. A drilling fluid comprising a solution in oil, wherein the oil is in the continuous phase, of an organic material selected from the group consisting of compounds represented by the following general formula:

$$[RN^+H_2(CH_2)_3NH_3^+][X^-]_2$$

wherein R is selected from the group consisting of alkyl and alkene radicals and X is an anion of an acid, the amount of said organic material present being in excess of that necessary to suspend solids originally present in the compounding of a mud prepared with said drilling fluid, said excess being sufficient to suspend in said drilling fluid solids subsequently encountered during drilling.

3. A drilling fluid comprising a solution in oil, wherein the oil is in the continuous phase, of an organic material selected from the group consisting of compounds represented by the following general formula:

$$[H_3N^+R][X^-]$$

wherein R is an alkyl radical and X is an anion of an acid, the amount of said organic material present being in excess of that necessary to suspend solids originally present in the compounding of a mud prepared with said drilling fluid, said excess being sufficient to suspend in said drilling fluid solids subsequently encountered during drilling.

4. A drilling fluid comprising a solution in oil, wherein the oil is in the continuous phase, of at least about 0.1 percent by weight of an organic material selected from the group consisting of compounds represented by the following general formulae:

$$[RN^+H_2(CH_2)_3NH^+][X^-]_2$$

wherein R is selected from the group consisting of alkyl and alkene radicals and X is an anion of an acid and $$[H_3N^+R][X^-]$$

wherein R is an alkyl radical and said latter X is an anion of an acid, said amount of said organic material present being in excess of that necessary to suspend solids originally present in the compounding of a mud prepared with said drilling fluid, said excess being sufficient to suspend in said drilling fluid solids subsequently encountered during drilling.

5. A drilling fluid comprising a solution in oil, wherein the oil is in the continuous phase, of at least about 0.1 percent by weight of an organic material selected from the group consisting of compounds represented by the following general formula:

$$[RN^+H_2(CH_2)_3NH_3^+][X^-]_2$$

wherein R is selected from the group consisting of alkyl and alkene radicals and X is an anion of an acid, said amount of said organic material present being in excess of that necessary to suspend solids originally present in the compounding of a mud prepared with said drilling fluid, said excess being sufficient to suspend in said drilling fluid solids subsequently encountered during drilling.

6. A drilling fluid comprising a solution in oil, wherein the oil is in the continuous phase, of at least about 0.1 percent by weight of an organic material selected from the group consisting of compounds represented by the following general formula:

$$[H_3N^+R][X^-]$$

wherein R is an alkyl radical and X is an anion of an acid said amount of said organic material present being in excess of that necessary to suspend solids originally present in the compounding of a mud prepared with said drilling fluid, said excess being sufficient to suspend in said drilling fluid solids subsequently encountered during drilling.

References Cited in the file of this patent

UNITED STATES PATENTS

| | | |
|---|---|---|
| 2,216,955 | Moore | Oct. 8, 1940 |
| 2,531,812 | Hauser | Nov. 28, 1950 |
| 2,675,353 | Dawson | Apr. 13, 1953 |
| 2,797,196 | Dunn et al. | June 25, 1957 |

UNITED STATES PATENT OFFICE
Certificate of Correction

Patent No. 2,900,336                                  August 18, 1959

William E. Brown et al.

It is hereby certified that error appears in the printed specification of the above numbered patent requiring correction and that the said Letters Patent should read as corrected below.

Column 1, line 43, for "drill" read —drilling—; column 4, line 18, and line 36, the formula, in each occurrence, should appear as shown below instead of as in the patent—

$$[RN^+H_2(CH_2)_3NH_3^+][X^-]_2$$

Signed and sealed this 1st day of March 1960.

[SEAL]

Attest:
KARL H. AXLINE,
*Attesting Officer.*

ROBERT C. WATSON,
*Commissioner of Patents.*